(12) United States Patent
Oosterling

(10) Patent No.: US 6,244,215 B1
(45) Date of Patent: Jun. 12, 2001

(54) DEVICE AND METHOD FOR MILKING ANIMALS

(75) Inventor: Pieter Adriaan Oosterling, Nieuw-Vennep (NL)

(73) Assignee: Prolion B.V., Vijfhuizen (NL)

( * ) Notice: Subject to any disclaimer, the term of this patent is extended or adjusted under 35 U.S.C. 154(b) by 0 days.

(21) Appl. No.: 09/341,035

(22) PCT Filed: Dec. 24, 1997

(86) PCT No.: PCT/NL97/00723

§ 371 Date: Sep. 3, 1999

§ 102(e) Date: Mar. 9, 1999

(87) PCT Pub. No.: WO98/28968

PCT Pub. Date: Jul. 9, 1998

(30) Foreign Application Priority Data

Dec. 31, 1996 (NL) .................................................. 1004922

(51) Int. Cl.[7] ........................................................ A01J 5/017
(52) U.S. Cl. ........................................................ 119/14.02
(58) Field of Search .............................. 119/14.01, 14.02, 119/14.03, 14.08

(56) References Cited

U.S. PATENT DOCUMENTS

| 5,524,572 | * | 6/1996 | Dessing et al. | 119/14.08 |
| 5,909,716 | * | 6/1999 | Van Der Lely et al. | 119/14.08 |
| 5,934,220 | * | 8/1999 | Hall et al. | 119/14.08 |

FOREIGN PATENT DOCUMENTS

| 4113700 | 10/1992 | (DE) . |
| 0300582 | 1/1989 | (EP) . |
| 0323875 | 7/1989 | (EP) . |
| 9400220 | 9/1995 | (NL) . |

* cited by examiner

*Primary Examiner*—Thomas Price
(74) *Attorney, Agent, or Firm*—Webb Ziesenheim Logsdon Orkin & Hanson, P.C.

(57) ABSTRACT

A device and a method for milking of animals is provided in which the teatcups are mounted on a milk rack and the milk rack can be moved with a positioning system in such a way that the teatcups are brought one after the other under a teat of the animals, whereafter the teatcups are brought upwards around the teat. For controlling the movements of the positioning system, a sensor system is used that can follow the position of a reference teat. A detection field of the sensor system is movable with regard to the milk rack in a direction similar to the breadth direction of the animal to be milked.

5 Claims, 2 Drawing Sheets

DEVICE AND METHOD FOR MILKING ANIMALS

BACKGROUND OF THE INVENTION

The invention concerns an animal milking device. A example of a known milking device is disclosed in EP 0323875.

In the known device, the position of one of the teats is detected by a sensor system 15 with sensors 16 whereafter positioning means bring the teatcups one after the other under the respective teats and attach the teatcups around the teats. The disadvantage of the known device is that it is sometimes unclear in the control system which of the front teats has been detected by the sensor system. Another disadvantage is that the detected teat can be brought outside the most sensitive part of the detection field when a teatcup is brought under a teat.

SUMMARY OF THE INVENTION

The invention aims to remove these disadvantages and thereto the sensor system comprises sensors for generating a detection field in at least two positions viewed breadthwise. By bringing the detection field in two breadth positions the front teats will be irradiated from at least two directions so that additional position-information is generated and the position of both front teats can be determined. Also one of the front teats can remain in the most sensitive part of the detection field during moving of the positioning means breadthwise when a teatcup is positioned under a teat.

In accordance with an embodiment the sensors are movable breadthwise relative to the positioning means. By making the sensors movable relative to the positioning means the detection field is moved in an easy way and simple sensors can be used. Also the movement can then be quick, so that the position of the cow and the teats is only little changed.

The invention also comprises a method in accordance with the preliminary part of claim 4. This method is known from the earlier mentioned document. The disadvantage of the known method is that it is not always clear from which front teats the position is determined by the sensors. In accordance with the invention for determining the position of a front teat the detection field is generated in at least two positions viewed breadthwise relative to the front teats. By moving the detection field the sensors can generate additional position information, so that the position of a front teat can be determined more accurately.

Also the invention comprises a method in accordance with the preliminary part of claim 5. This method is known from the earlier mentioned document. In the known method during attaching of the teatcups the movements of the cow are followed by means of sensors. This is done by following the movements of one of the front teats, after this front teat has been brought in the detection field. During the positioning of a teatcup under a teat which is not followed by the sensors the position of the teat that has been followed will change in regard to the positioning means and also in regard to the detection field. This causes the teat to move outside the most sensitive part of the detection field which results in a deteriorated measuring signal, which is a disadvantage. In accordance with the invention, during the attachment the detection field is moved breadthwise relative to the positioning means so that one of the two front teats remains in the more sensitive part of the detection field. This prevents the earlier mentioned disadvantage.

BRIEF DESCRIPTION OF THE DRAWINGS

The invention is hereafter illustrated with help of an embodiment with drawings wherein.

In the various figures the similar parts have been provided with similar numbers.

DESCRIPTION OF THE PREFERRED EMBODIMENT

Figure 1:
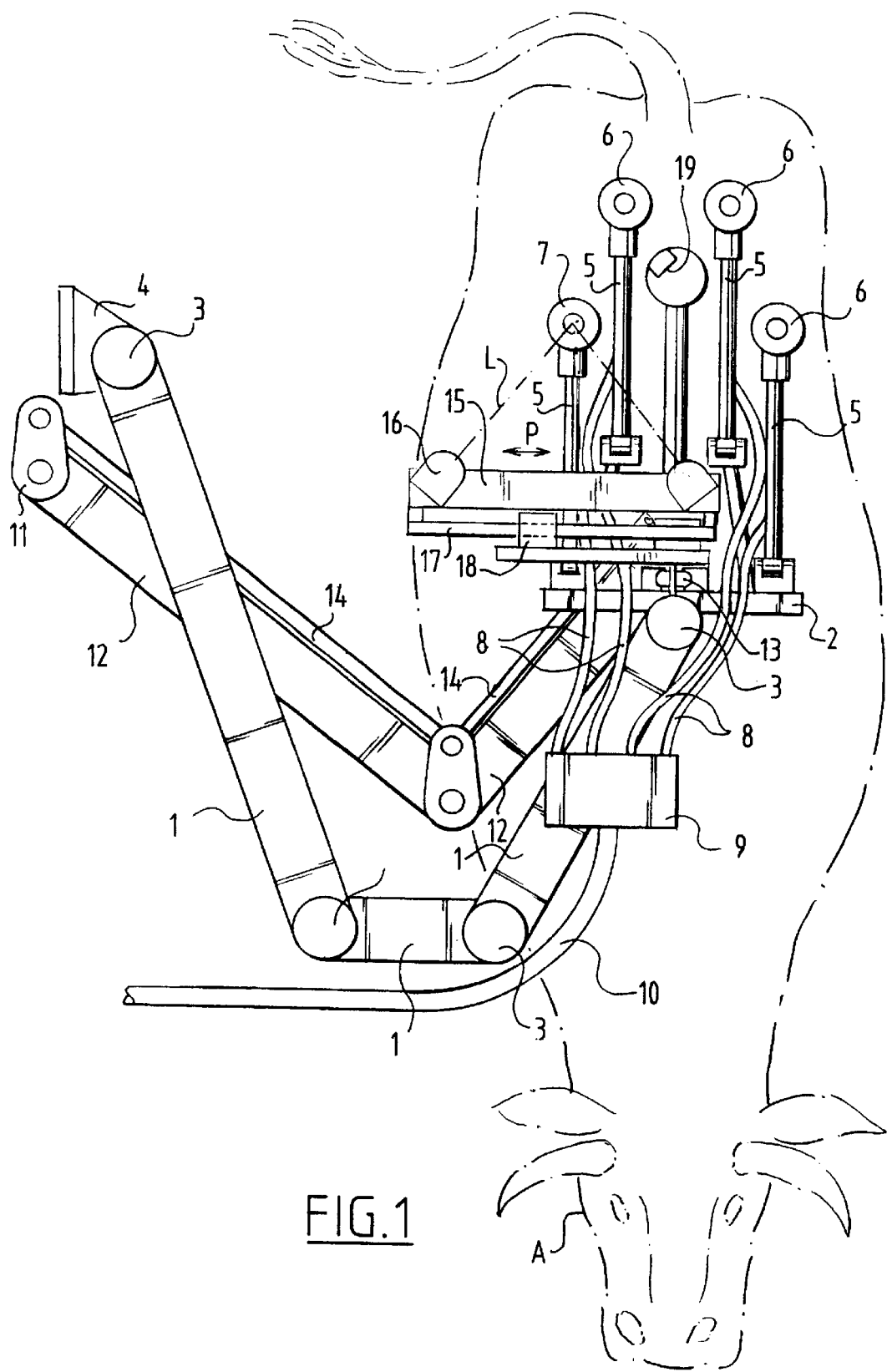
FIG. 1 shows a schematically topview of a milking parlour for cows.

In FIG. 1 a top view of a milking parlour is shown wherein a to be milked animal A has been indicated schematically. The attachment of teatcups around the teats is executed in hereafter described way with a positioning and attachment system under control of a control system, such a system is known under the name milk robot. The following of the position of the teats during attachment is thereby important, whereby the invention inter alia concerns the sensor system used.

Teatcups 6 and 7 are connected with a teatcup-arm 5 to a milk rack 2. This milk rack 2 is attached to the side of the milking parlour via hinges 3 and milk rack-arms 1 and a support 4. The milk flows from the teatcups 6 and 7 through a milk line 8 to a collector 9 and from there through a milk drain 10 to a milk tank which is not shown.

During the attachment of the teatcups 6 and 7 around the teats the milk rack 2 is moved by a milk robot with robot arms 12. The milk robot is fastened to the side of the milking parlour with a support 11 or can be connected to a movable support that makes it possible that the milk robot is moved to a different milking parlour for connecting teatcups of a different milk rack to a different cow. For that reason the milk robot is detachably connected to the milk rack 2 with a robot gripper 13. For ensuring that the milk rack 2 remains in the same direction during attaching of the teatcups a guide rod 14 is attached along the robot arms 12.

For following the position of a reference teat the milk robot is provided with sensors 16. When the milk robot and the milk rack 2 are connected these sensors 16 when in a middle position are directed with a centre-line L at the teatcup 7, wherein the reference teat will be brought. The sensors 16 are placed on a sensor support 15 which is connected to-a slide guide 17, which can move in slide 18 in a direction P substantially perpendicular to the longitudinal direction of the milking parlour. The position of the slide 18 relative to the slide guide 17 is recorded in the control system. As the sensors 16 have a known position in the control system relative to the milk rack 2, the milk rack can follow the movements of the udder of the animal to be milked, for instance by following the movements of the reference teat.

Through the now known position of the reference teat the teatcup 7 can now be brought around the reference teat by the milk robot. With the teat position sensor 19, the position of the other three teats relative to the reference teat can be measured. In this way the positions of all teats are known in the control system and the teatcups 6 can also be brought under their respective teats. In addition to measuring the relative teat positions with the teat position sensor 19, the teat positions can be determined also in other ways. It is for instance possible to calculate the relative positions of the teats from the known teat position of a certain animal directly after milking and the time that has passed since the last milking.

Due to the relative teat position of a certain animal usually being not identical to the relative positions of the teatcups on the milk rack, the reference teat will not be directly above teatcup 7 when the teatcups 6 are brought under their respective teats and will no longer be in the centre of the detection field of the sensors 16 that are in the middle position. As the deviation is known in the control system, the sensors 16 will be moved in this known distance in direction P until the reference teat is well detectable again.

Figure 2:
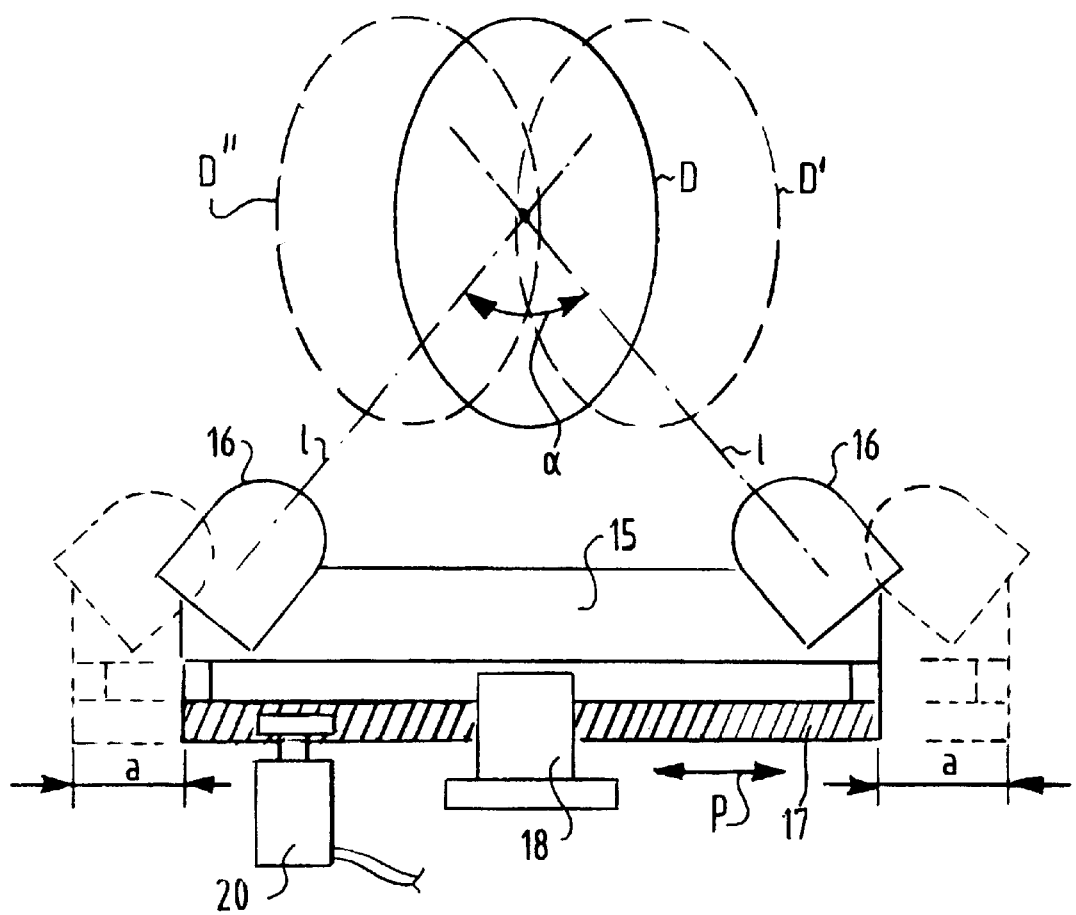
FIG. 2 shows a detail in topview from the sensor system shown in FIG. 1 for the detecting of the position of a teat.

In FIG. 2 the sensor system is shown in top view. The sensors 16 are direction sensitive ultrasonic sensors with a centreline L of the ultrasonic beam, whereby each sensor 16 in the direction L can measure the distance to the object to be detected, in this case the reference teat. Both sensors 16 together determine the detection field D wherein the presence and the position of the teat can be determined in the horizontal plane. In this case the detection field has been generated by the centrelines L of the detection seams making an angle α of approximately 80° so that it is more or less elliptically shaped. As this angle α goes to 90° the shape will be more or less circular and with smaller angles α the ellipse will get narrower.

By moving the sensor support 15 with the sensors 16 connected thereto in the directions P over a distance in the one or the other direction, the detection field moves to D' or D". During this movement the slide guide is moved by a slide drive 20 which slide drive 20 is provided with means for determining the position of the slide relative to the milk rack 2. The slide drive can be made in various known ways, for instance with a stepper motor, a servomotor or for instance with a single or multi-stage air cylinder whereby the slide can be brought in two or three positions relatively to the slide guide.

In the shown embodiment the angle α is relative large and the distance between the detection field and the sensors 16 is small. In this way the to be detected teat gives a stronger reflection and for that reason its position can be determined accurately. This is made possible as the teat does not leave the detection field anymore as the changing position of the teat when bringing the teatcups 6 under a teat is followed by movement of the sensor in the direction P. Due to the more or less elliptical form of the detection field D the movements in the longitudinal direction of the animal have less influence. It is known that the dimension of the detection field D is no absolute boundary, but that in the centre of the ellipse the detection field D has the highest sensitivity, and that this sensitivity diminishes as an object is further from the centre. The ellipse D indicates the points whereby the sensitivity is more or less equal and outside of which the sensitivity comes under a value that is deemed acceptable.

Figure 3:
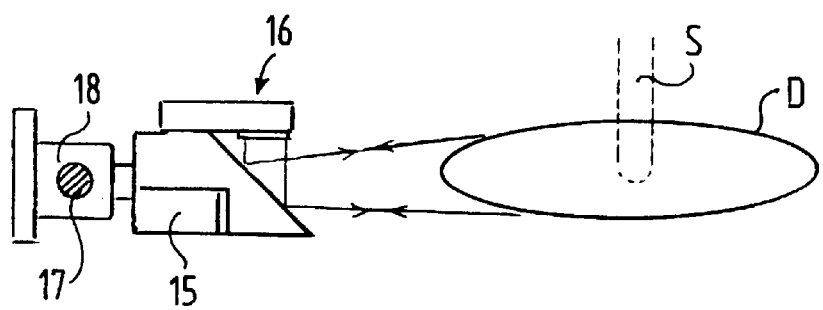
FIG. 3 shows the sensor system of FIG. 2 in sideview.

In FIG. 3 a sideview of FIG. 2 is shown, whereby the shown shape of the detection field D is as a field that is created with the ultrasonic sensor 16 with a translucent placed as shown in EP A 0323875 above a cone shaped mirror and whereby a substantially flat detection field is created. In the detection field D a to be detected teat S is shown.

The invention can also be used in other sensor systems for detecting the position of a teat and which have a limited detection field so as for instance position-determination systems which are based on the reflection of light.

In addition to the therefore described use during attachment of teatcups around teats the movable detection field D of the sensors 16 is also used in another way. When the udder of the cow is approached from the front and the sensors 16 approach the teats, it is possible that there is no success in bringing the desired teat directly in the centre of the detection field D. It may happen for instance that the two front teats of the udder are both irradiated by the sensors 16 and give reflections. It is then for the control system of the sensor system not possible or very difficult to determine the position of the teats, as the received sensor information is contradictory. By moving the sensors 16 for instance in the direction P to the left and to irradiate the teat with the sensors 16 from the new position new reflections will be received, whereby it will then be possible that reflections of only one teat are received. After that the sensors 16 can be moved to the right whereby further additional information can be become available. By placing the sensors 16 on a sensor support 15 that is movable in the direction P the movements of the sensor 16 can be executed quickly as this sensor support 15 with sensors 16 has a far smaller mass than that remaining part of the construction that moves to the udder. As a result of this quick movement, the cow has often moved very little and the combination of the different view points results in good position information. Due to this small mass the teats can be irradiated quickly with the sensors 16 on several positions breadthwise of the parlour, so that with the help of the detection field D the desired teat can be found and can be followed further during the attachment of the teatcups. It maybe possible to use this method of working also with sensors that are fixed to the positioning means. The movements of the sensors will then take more time, so that the accuracy is reduced. The construction though is more simple.

In addition to an application as described with the above mentioned embodiment the invention can also be used in milk systems whereby not four but two teatcups are attached at a time, or whereby one teatcup at a time is attached to a teat. Also in that case the quick movement breadthwise of the detection field D is used for detecting quickly the desired front teat. Thereby the sensor can move quickly breadthwise which saves time and the robot can remain moving slowly. This has the advantage that the robot under the animal to be milked makes quiet movements which reduces the irritation of the animal.

In another embodiment the possibility to use two detection fields is used for detecting the position of the hind teats as well. As the udder is irradiated from two different directions at least in one direction a hind teat will not be in the shadow of the front teats. In this way with a single sensor system that can irradiate the udder from two positions the position of all four teats can be determined.

What is claimed is:

1. A device for milking animals, comprising:
   a milking device with teatcups;
   positioning means for approaching a front side of an udder with at least one teatcup, positioning a teatcup under a teat and attaching the teatcup around the teat;
   control means for controlling the milking device and the positioning means;
   a sensor system for detecting the position of a teat with at least one sensor having a detection field generated by the at least one sensor which is substantially in a horizontal plane behind the at least one sensor,
   wherein the at least one sensor is coupled with the positioning means, wherein the sensor system feeds the control means with two-dimensional position information of the teats detected in the detection field, and wherein the detection field is movable to at least two sensor active positions viewed breadthwise relative to the positioning means.

2. The device according to claim 1, including a plurality of sensors generating said detection field which are movable breadthwise relative to the positioning means.

3. The device in accordance with claim 2, wherein the sensors are connected to the positioning means with a longitudinal guide having a drive and with means for determining the positions of the sensors relative to the positioning means.

4. A method for milking animals, comprising the steps of:
  moving teatcups with positioning means from a front to an udder of an animal to be milked;
  positioning the teatcups under a teat of the udder and attaching the teatcups to the teat whereafter milking is started,
  wherein during the attaching step the positioning means are controlled by a control system,
  wherein the control system is provided with information concerning a two-dimensional position of the teats by a sensor system coupled to the positioning means having a detection field generated by at least one sensor in a substantially horizontal plane behind the at least one sensor and which determines the position of at least one of two front teats, and
  wherein during attaching of the teatcups the detection field is generated in at least two sensor active positions viewed breadthwise relative to the positioning means for determining the position of a front teat.

5. The method in accordance with claim 4, wherein during attaching the teatcup has a fixed position relative to the positioning means, and wherein during attaching said detection field is moved breadthwise relative to the positioning means for keeping one of two front teats in a more sensitive part of the detection field.

* * * * *

UNITED STATES PATENT AND TRADEMARK OFFICE
CERTIFICATE OF CORRECTION

PATENT NO. : 6,244,215 B1
DATED : June 12, 2001
INVENTOR(S) : Pieter Adriaan Oosterling Page 1 of 1

It is certified that error appears in the above-identified patent and that said Letters Patent is hereby corrected as shown below:

<u>Title page,</u>
Item [86] § 102(e) Date: "Mar. 9, 1999" should read -- Sep. 3, 1999 --.

<u>Column 1,</u>
Lines 5-6, "A example" should read -- An example --.

<u>Column 3,</u>
Line 16, "seams" should read -- beams --.
Line 22, "distance in" should read -- distance "a" in --.
Line 32, "relative large" should read -- relatively large --.

Signed and Sealed this

First Day of January, 2002

Attest:

Attesting Officer

JAMES E. ROGAN
*Director of the United States Patent and Trademark Office*